(12) United States Patent
Watson et al.

(10) Patent No.: US 11,259,193 B2
(45) Date of Patent: Feb. 22, 2022

(54) SYSTEMS AND METHODS FOR OBTAINING AND DISTRIBUTING DYNAMIC FREQUENCY SELECTION DATA FOR WIRELESS NETWORKS ON AIRPLANES

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 118 days.

(21) Appl. No.: 16/785,515

(22) Filed: Feb. 7, 2020

(65) Prior Publication Data

US 2021/0250784 A1 Aug. 12, 2021

(51) Int. Cl.
*H04W 24/02* (2009.01)
*G08G 5/00* (2006.01)
*H04B 7/185* (2006.01)
*H04W 24/08* (2009.01)
*H04W 4/42* (2018.01)
*H04W 4/46* (2018.01)
*G01S 7/02* (2006.01)
(Continued)

(52) U.S. Cl.
CPC ......... *H04W 24/02* (2013.01); *G08G 5/0039* (2013.01); *H04B 7/1853* (2013.01); *H04W 4/42* (2018.02); *H04W 4/46* (2018.02); *H04W 24/08* (2013.01); *G01S 7/023* (2013.01); *H04W 84/12* (2013.01); *H04W 88/08* (2013.01)

(58) Field of Classification Search
None
See application file for complete search history.

(56) References Cited

U.S. PATENT DOCUMENTS 7,620,364 B2 * 11/2009 Higashida .......... H04B 7/18508
455/11.1
8,233,425 B2 * 7/2012 Lynch .................. H04N 21/238
370/316

(Continued)

OTHER PUBLICATIONS

Zodiac Aerospace, Zodiac Inflight Innovations, https://www.aviation-ia.com/sites/default/files/media-files/DFSMonitoringProject.pdf, May 16, 2019.

*Primary Examiner* — Tri H Phan
(74) *Attorney, Agent, or Firm* — Perkins Coie LLP

(57) ABSTRACT

Systems and methods for obtaining data for Dynamic Frequency Selection (DFS) events caused by interfering signals, such as radar signals, in mobile WiFi wireless communication networks on airplanes. The systems and methods utilize wireless access points (WAPs) on in-flight entertainment systems on airplanes to detect DFS events, and obtain DFS event data. The DFS event data is transmitted to a ground system which is configured to utilize the DFS event data to generate DFS messages which allow a WAP on another airplane to avoid the interfering signals that caused the DFS event. The ground system transmits the DFS messages to other airplanes which use the information in the DFS message to configure a WAP to avoid DFS events. The ground system may also be configured to analyze and generate a 3D DFS map which can be used to generate radio channel plans to avoid DFS events.

17 Claims, 9 Drawing Sheets

(51) Int. Cl.
*H04W 88/08* (2009.01)
*H04W 84/12* (2009.01)

(56) References Cited

U.S. PATENT DOCUMENTS

| | | | |
|---|---|---|---|
| 8,504,019 B2* | 8/2013 | Lynch | H04B 7/18508 |
| | | | 455/430 |
| 9,313,527 B2* | 4/2016 | Couleaud | H04N 21/2146 |
| 9,350,423 B2* | 5/2016 | Mitchell | H04B 3/542 |
| 9,673,863 B2* | 6/2017 | Mitchell | H04B 3/542 |
| 10,009,735 B2* | 6/2018 | Still | H04L 67/12 |
| 10,136,293 B1* | 11/2018 | Rabii | H04W 8/005 |
| 10,511,948 B2* | 12/2019 | Rabii | H04W 4/80 |
| 2003/0107512 A1 | 6/2003 | McFarland | |
| 2007/0213009 A1 | 9/2007 | Higashida | |
| 2010/0290414 A1 | 11/2010 | Yamada | |
| 2017/0150368 A1 | 5/2017 | Ngo | |

\* cited by examiner

SYSTEMS AND METHODS FOR OBTAINING AND DISTRIBUTING DYNAMIC FREQUENCY SELECTION DATA FOR WIRELESS NETWORKS ON AIRPLANES

BACKGROUND

The field of the invention generally relates to wireless communication networks, and more particularly, to systems and methods for obtaining and distributing dynamic frequency selection ("DFS") event data for wireless networks on airplanes, and providing real-time notification of DFS events to allow other wireless networks on airplanes to avoid DFS events, and using the DFS event data to generate a map which can be used to configure wireless networks on airplanes to avoid DFS events.

WiFi (sometimes referred to as Wi-Fi) is a wireless networking technology based on a set of IEEE standards, and which is commonly used for local area networks (LAN) for wireless communication between various electronic devices, including computers (e.g., personal computers, smartphones, etc.) and other electronic devices, and also for connecting such devices wirelessly to the Internet. Accordingly, WiFi enabled devices may communicate directly with each other using WiFi in a Peer to Peer connection, or they may communicate via a wireless access point (WAP) configuration in a wireless local area network (WLAN) with each other and/or with other networks connected to the WAP such as a wide area network and/or the Internet (in such case, the WAP may be wireless router which integrates the wireless access point, a switch, and/or a WAN-interface such as IP routing firmware, etc.). As used herein, the term "wireless access point (WAP)" include devices referred to as wireless access points, as well as devices commonly referred to as wireless routers, which utilize the WiFi IEEE wireless networking standards. Each of the electronic devices has a wireless adapter which allows the devices to connect and communicate (with each other and/or with a WAP) via WiFi. The wireless adapters connect to the electronic device using various interconnects such as a bus (e.g., PCI, USB, etc.).

WiFi operates in several distinct frequency ranges for use in wireless communications, including the most common 2.4 GHz and 5 GHz, and each of the ranges is divided into a plurality of radio channels. For example, in the United States, the 2.4 GHz band is divided into 11 channels and the 5 GHz band has at least 23 radio channels.

WiFi wireless networks share the 5 GHz spectrum with a number of other technologies and services, especially radar, such as military radars, government radars, and weather radars. Thus, regulatory and/or standards (which may vary by country) require WiFi wireless networking devices to avoid interference with the certain other users of the 5 GHz spectrum. Once such requirement is referred to as Dynamic Frequency Selection ("DFS"). DFS requires WiFi wireless networking devices to monitor each radio channel in the 5 GHz band for radar signals, and if a radar signal is detected on a radio channel (referred to as a DFS event), the wireless networking device must vacate the radio channel and remain off the channel for 30 minutes. As a result, if a WiFi wireless networking device detects a DFS event, the device must change radio channels within the 5 GHz band which causes a disruption in the wireless communication service. It also takes time to re-establish the wireless connection and to re-transmit any lost data during the disruption. For instance, if the wireless network is being utilized to stream media, such as a movie or music, the playing of the media may be interrupted which can be frustrating and annoying to a user.

Wireless networks utilizing WiFi have been implemented on airplanes to provide wireless communications during flights (and also while the airplane is on the ground). The WiFi wireless networks on airplanes have been used to provide wireless network communication between onboard different onboard airplane systems, between onboard airplane systems and personal electronic devices (PEDs) of passengers, between different personal electronic devices of passengers, and/or to provide Internet access to onboard airplane system and/or PEDs. For example, some inflight entertainment systems (IFEs) on airplanes have a WAP which provides wireless communication between an onboard server, video display systems installed throughout the cabin, and/or PEDs. The WAP may also be connected via an air-to-ground communication link (e.g., a satellite communication link) to a WAN and/or the Internet. This allows an IFE to distribute media content, such as movies and music, to the video display systems and/or PEDs, as well as provide Internet access to the video display systems and/or PEDs. Since airplanes travel through airspace in which radar systems transmit radar signals, WiFi wireless networks on airplanes also encounter interfering radar signals which cause DFS events, and the related wireless communication service disruptions.

A number of solutions have been previously proposed to minimize disruptions in WiFi communications caused by DFS. For example, U.S. Published Patent Application No. 2017/01509368 A1 to Ngo et al. describes a system and method for using a radar detector to determine geolocations of radar signals which cause a DFS event. The data is used to construct a spatial map of the interfering radar signals, and the map is then used to determine which radio channels are available and free of the interfering radio signals at a location of a particular wireless device.

Similarly, U.S. Published Patent Application No. 2003/0107512 A1 to McFarland et al. describes a system for detecting radio signals and screening the signals to determine which are radar signals and which are non-radar signals. The system also utilizes network load reduction schemes to reduce disruptions in service caused by DFS events from detected interfering radar signals. U.S. Published Patent Application No. 2010/0290414 to Yamada describes a system and method for mitigating the disruptions caused by detected DFS events. When the channel is changed due to a DFS event, the wireless communication devices notify device(s) at the other end of the wireless communication of the new channel. The new channel may be communicated even before an actual channel change.

The publication entitled "The DFS Monitoring Project for Cabin 5 GHz Wi-Fi Channel Definition" by Zodiac Aerospace, describes a proposed project for detecting and mapping ground-based radar systems which disrupt WiFi channels in the 5 GHz band, i.e., radars which cause DFS events. The proposal describes a reference hardware design for specific DFS monitoring equipment to be carried onboard an airplane to detect radar which will cause a DFS event. The reference design includes a portable autonomous device, expected to be producible for under $100 each. The publication describes that the specific devices are to be carried onboard flights by each of the participants in the project to collect DFS event data. The DFS event data for each flight is then aggregated on a cloud-based server. The DFS event data is post-processed to include incomplete event location and altitude data for each flight using publicly available flight path databases. In other words, the raw DFS event data does not include the geographic location and altitude for each respective DFS event. Instead, the geographic location and altitude are determined using flight path databases which show the typical flight path for commercial flights. This is not the flight path data taken during the actual flight in which the DFS event data is recorded. It is understood that the publicly available flight path data would be used to interpolate the geographic location and altitude for each respective DFS event using a time of the DFS event and the publicly available flight path data. The aggregated and post-processed DFS event data is then used to create a color-coded map of the WiFi channels interfered by the radars detected in the DFS events. The map may then be used to configure onboard WiFi networks in a given region or on a given flight to avoid 5 GHz channels subject to DFS events from interfering radar signals.

However, the previously disclosed systems and methods have a number of drawbacks and deficiencies. For one, none of the previously disclosed systems and methods disclose utilizing an WAP of an IFE to detect DFS events. Furthermore, none of the previously disclosed systems and methods provide any real-time detection and response means for other WAPs to avoid interfering signals detected by another WAP. In addition, the system proposed in the Zodiac Aerospace publication requires specialized equipment to be carried onboard an airplane, as well as a post-processing method which does not provide accurate location data for the recorded DFS events.

SUMMARY

In one embodiment, the present invention is directed to an innovative system for obtaining data for DFS events caused by interfering signals, such as radar signals, encountered by an airplane during its operation, including while the airplane is in flight. As described herein, WAPs on airplanes may experience DFS events requiring the WAPs to vacate the current radio channel, remain off the vacated channel for 30 minutes. In addition, the WAP will switch to another radio channel free of the interfering signal in order to resume the WiFi wireless communication. As further described herein, the DFS event data obtained by the system may be used to allow WAPs on other airplanes to avoid the DFS events caused by the interfering signals.

In one innovative aspect, the system utilizes a WAP of an IFE, which in many cases is installed or is configured to be installed, on a first airplane. The WAP is configured to wirelessly communicate with one or more wireless electronic devices on the airplane, such as other onboard electronic equipment and/or PEDs. The WAP is also configured to detect DFS events. The IFE is in communication with an onboard avionics system, such as via a wired and/or wireless communication network. The onboard avionics system is configured to obtain airplane location data and provide the airplane location data to the IFE. The onboard avionics system may utilize GPS, sensors (e.g., altimeter, accelerometers, etc.), remote communications, etc. to determine the airplane location. For instance, the airplane location data may be the same data used by the airplane for navigation and other flight requirements.

The IFE is configured to use the wireless access point to detect a DFS event caused by an interfering signal within a signal range of the wireless access point, such as a radar signal. The IFE obtains DFS event data for the DFS event. The IFE also obtains airplane location data at the time of the DFS event from the onboard avionics system. The IFE associates the DFS event data with the airplane location data in a DFS event record. The IFE then transmits the DFS event record to a ground system via an air-to-ground communication link. For example, the air-to-ground communication link may be a satellite communication link or a private cellular or a private cellular provider link.

In another aspect, the system may detect multiple DFS events caused by various interfering signals occurring at different locations. For each DFS event, the IFE obtains respective airplane location data for the respective DFS event, associates each DFS event with the respective location data, associates each DFS event with the respective DFS event in a respective DFS event record, and transmits the DFS event records to the ground system via the air-to-ground communication link.

In still another aspect, the system may also include a ground system configured to utilize the DFS event records to provide real-time (i.e., live) messages to other airplanes to allow WAPs on the other airplanes to avoid the interfering signal(s) that caused the DFS events detected by the IFE on the first airplane. As used herein, the term "real-time" means "occurring in substantially the time required in the performance of computations, analysis and communication by a computerized system, including reasonable time for latency, queuing of functions, and transmission of communications." The ground system comprises a computer which is in communication with the IFEs via the air-to-ground communication link, and/or one or more LANs and/or WANs. The ground system is configured to perform the following functions, in real-time: (a) receive the DFS event record from the first airplane; (b) analyze the DFS event record; and (c) transmit a DFS message to a second IFE on a second airplane which is scheduled to travel within a predetermined vicinity of the DFS event, to allow a WAP of the second IFE to avoid the interfering signal which caused the DFS event.

In another feature, the DFS message may include various information for the WAP to use to avoid the interfering signal. For instance, the DFS message may include radio channel data which the WAP of the second IFE can utilize to avoid the interfering signal which caused the DFS event. The radio channel data may include at least one of: (a) identification of one or more radio channels which avoid the interfering signal which caused the DFS event; and (b) identification of one or more radio channels which caused the DFS event. In this way, the WAP of the second IFE can use a radio channel which will avoid having a DFS event when it encounters the interfering signal.

In another aspect, the DFS message may include radio channel data and DFS location data for the DFS event which the wireless access point of the second IFE can utilize to avoid the interfering signal which caused the DFS event. This allows the wireless access point of the second IFE to analyze the radio channel data and DFS location data and determine a plan of radio channels during its flight along a flight path to avoid, or at least minimize, the number of changes of the radio channel to avoid DFS events during the flight. As described herein, there is a disruption in the wireless communications during radio channel changes.

In still another aspect, the DFS location data may include a delineation (i.e., a description) of the flight path of the second airplane in which to avoid the interfering signal. For example, the DFS message may instruct the wireless access point of the second IFE which radio channels to use during which portions of the flight path.

Another embodiment of the present invention is directed to a method for obtaining data for DFS events caused by interfering signals, such as radar signals, encountered by an airplane during its operation, including while the airplane is in flight. The method may be performed by the system described herein, or a similar system. The method includes detecting a DFS event caused by an interfering signal (e.g., a radar signal) using a WAP of an IFE on a first airplane, and obtaining DFS event data for the DFS event. The IFE obtains location data at the time of the DFS event from an onboard avionics system on the airplane. The IFE associates the DFS event with the airplane location data in a DFS event record. Then, the DFS event record is transmitted to a ground system via an air-to-ground communication link.

In another aspect, the method may further comprise a ground system, same or similar to the ground systems described herein, utilizing the DFS event record to provide real-time (i.e., live) messages to other airplanes to allow WAPs on the other airplanes to avoid the interfering signal that caused the DFS event detected by the IFE on the first airplane. Thus, the method includes the ground system, in real-time: (a) receiving the DFS event record; (b) analyzing the DFS event record; and (c) transmitting a DFS message to a second IFE on a second airplane which is scheduled to travel within a predetermined vicinity of the DFS event to allow a wireless access point of the second IFE to avoid the interfering signal which caused the DFS event.

In still another aspect of the method, the DFS message may include radio channel data which the wireless access point of the second IFE can utilize to avoid the interfering signal which caused the DFS event.

In another aspect of the method, the DFS message may include radio channel data and DFS location data for the DFS event which the wireless access point of the second IFE can utilize to avoid the interfering signal which caused the DFS event.

In additional aspects, the method may include performing any of the functions and utilizing any of the features of the additional aspects described herein for the systems from obtaining DFS data.

Another embodiment of the present invention is directed to a system for analyzing and mapping DFS event data obtained from a plurality of airplanes. The system comprises a computerized ground system comprising a computer, which may be the same or similar to the ground system described above. The computerized ground system is configured to receive DFS event data for a DFS event from a plurality of wireless access points on respective different airplanes. The DFS event is caused by respective interfering signals within a respective signal range of the respective wireless access point. The wireless access points are components of a respective IFE on each airplane. The DFS event data includes associated location data at the respective time of the respective DFS event, wherein the location data is from a respective onboard avionics system on each airplane. The computerized ground system is further configured to analyze the DFS event data and generate a DFS map of the DFS event data. The DFS map can be utilized to select radio channels for a WAP on an airplane to avoid DFS events.

In another aspect of the system, the computerized ground system is configured to receive the DFS event data from the airplanes via an air-to-ground communication link. In still another feature, the computerized ground system comprises either a satellite communication module or a private cellular provider link for receiving the DFS event data via the air-to-ground communication link. Alternatively, the computerized ground system may be communicatively coupled to a wide area network which is communicatively coupled to the air-to-ground communication link.

In another aspect of the system, the computerized ground system is configured to receive the DFS event data from the airplanes via a manual offload of the DFS event data from the IFE on each airplane to one or more storage devices and transfer of the DFS event data from the one or more storage devices to the computerized ground system.

In still another aspect of the system, the ground system may be further configured to utilize the DFS map to provide WAP radio channel information to other airplanes to allow WAPs on the other airplanes to avoid DFS events during the flights of the other airplanes. Accordingly, the ground system is further configured to receive flight plan data for a flight of a first airplane. The ground system is also configured to analyze the flight plan data in view of the DFS map, determine radio channel information for the first airplane to allow a WAP on the first airplane to avoid one or more DFS events during the flight of the first airplane, and transmit the radio channel information to the first airplane. In another aspect, the ground system may be configured to perform these functions in real-time.

The ground system may transmit the radio channel information to the airplane via the air-to-ground communication link. Alternatively, the radio channel information may be transferred to the airplane via manual data loading of the radio channel information from a storage device to a respective IFE on each airplane.

In another aspect, the ground system may be configured to utilize the DFS map to provide WAP radio channel information to a fleet of airplanes to allow WAPs on the fleet of airplanes to avoid DFS events during the flights of the fleet of airplanes. In such case, the ground system is configured to receive flight plan data for a fleet of planned airplane routes. The ground system analyzes the flight plan data for each airplane route in view of the DFS map and determines radio channel information for each airplane route to allow a wireless access point on an airplane on that airplane route to avoid one or more DFS events during a flight using that route. The ground system then transfers the radio channel information for each airplane route to the airplane fleet. The ground system may transfer the radio channel information via the air-to-ground communication link, or via manual data loading of the radio channel information from a storage device to a respective IFE on each airplane.

In still another aspect of the system the ground system may be further configured to provide revised radio channel information in real-time when the flight plan for the first airplane changes. For example, the flight plan for an airplane may be changed, before or during a flight, due to weather, air traffic, and/or other reasons. The ground system is configured to, in real-time: (a) receive revised flight plan data for the flight of the first airplane; (b) analyze the revised flight plan data in view of the DFS map and determine revised radio channel information for the first airplane to allow the wireless access point on the first airplane to avoid one or more DFS events during the flight of the first airplane; and (c) transmit the revised radio channel information to the first airplane.

In yet another aspect of the system, the radio channel information may include at least one of: (a) identification of one or more radio channels for the WAP to utilize during the flight of the first airplane; and (b) identification of one or more radio channels for the WAP to avoid utilizing during the flight of the first airplane.

Another embodiment of the present invention is directed to a method for analyzing and mapping DFS event data obtained from a plurality of airplanes. The method may be performed by the system having a computerized ground system, as described herein, or a similar system. The method a computerized ground system receiving DFS event data from a plurality of wireless access points on respective different airplanes. The DFS event data is caused by respective interfering signals within a respective signal range of the respective wireless access point. The DFS event data including associated location data at the respective time of the respective DFS event from a respective onboard avionics system on each airplane. The computerized ground system analyzes the DFS event data and generates a DFS map of the DFS event data which can be utilized to select radio channels on an airplane to avoid DFS events.

In another aspect, the method further includes utilizing the DFS map to provide WAP radio channel information to other airplanes to allow WAPs on the other airplanes to avoid DFS events during the flights of the other airplanes. The ground system receives flight plan data for a flight of a first airplane for which the radio channel information is to be provided. The ground system analyzes the flight plan data in view of the DFS map, determines radio channel information for the first airplane to allow a WAP on the first airplane to avoid one or more DFS events during the flight of the first airplane, and transmits the radio channel information to the first airplane. In another aspect, the method may include performing these steps in real-time.

Similar to the system described above, the method may also include providing revised radio channel information in real-time when the flight plan for the first airplane changes. For example, the flight plan for an airplane may be changed, before or during a flight, due to weather, air traffic, and/or other reasons. The method includes the ground system performing the following in real-time: receiving revised flight plan data for the flight of the first airplane; analyzing the revised flight plan data in view of the DFS map and determining revised radio channel information for the first airplane to allow the wireless access point on the first airplane to avoid one or more DFS events during the flight of the first airplane; and transmitting the revised radio channel information to the first airplane.

In additional aspects, the method may include performing any of the functions and utilizing any of the features of the additional aspects described herein for the systems from analyzing and mapping DFS event data obtained from a plurality of airplanes.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION

The present invention is directed to systems and methods for detecting DFS events on an airplane caused by interfering signals, such as radar signals, and obtaining DFS event data for the DFS events. The system and methods may be configured to utilize the DFS event data to provide real-time messages to airplanes to allow WAPs on the airplanes to avoid the interfering signals and DFS events caused thereby. The systems and methods may also be configured to analyze the DFS event data and create a DFS map of the DFS events which can be used to avoid DFS events on WAPs on future flights. The systems and method may also be configured to utilize the DFS map to determine radio channel information for a flight of an airplane to avoid DFS events, and provide the radio channel information to the airplane.

Figure 1A:
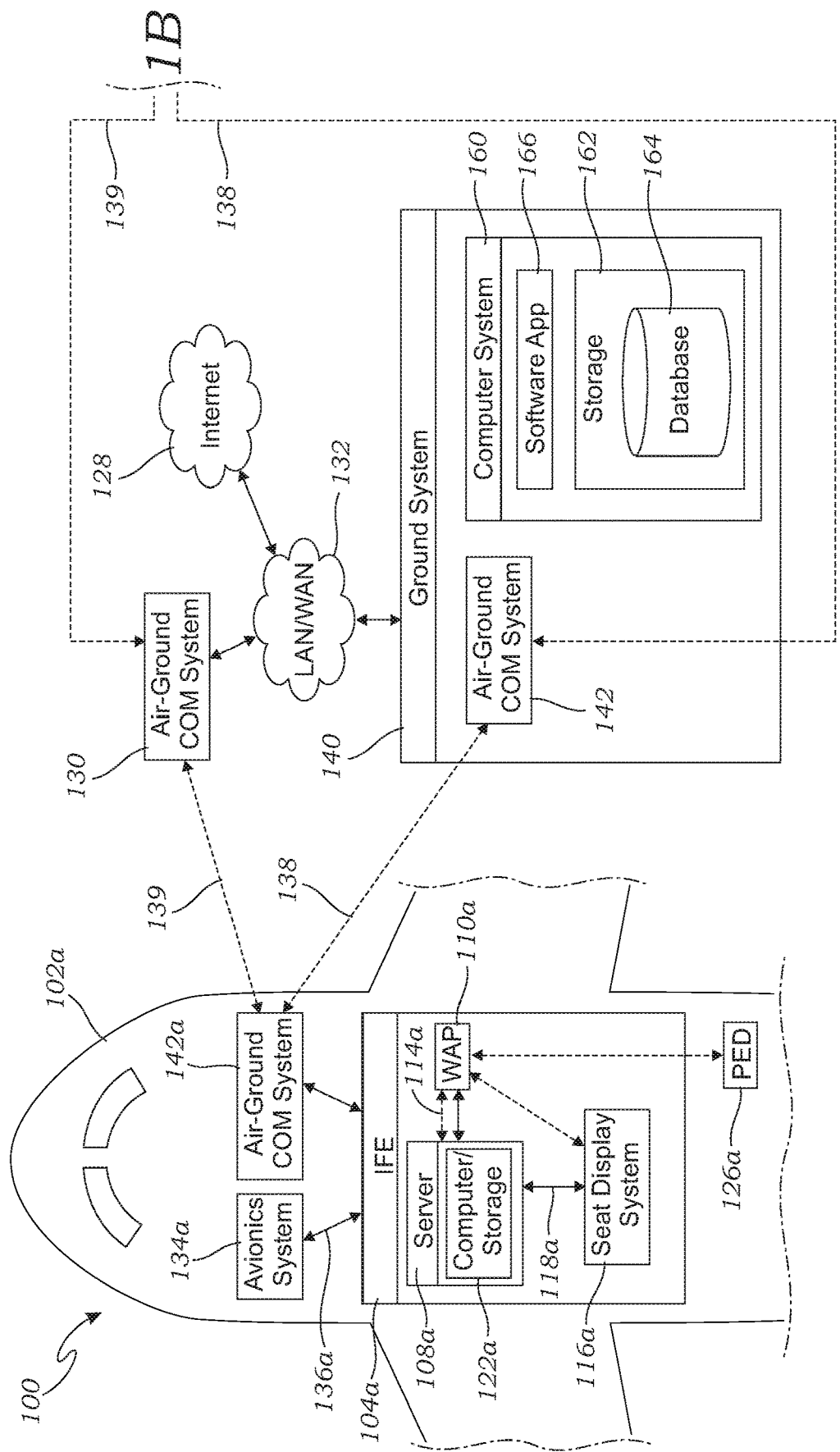
FIGS. 1A-1B illustrate a block schematic diagram of a system for obtaining DFS event data when installed on an airplane, according to one embodiment of the present invention.
Figure 1B:
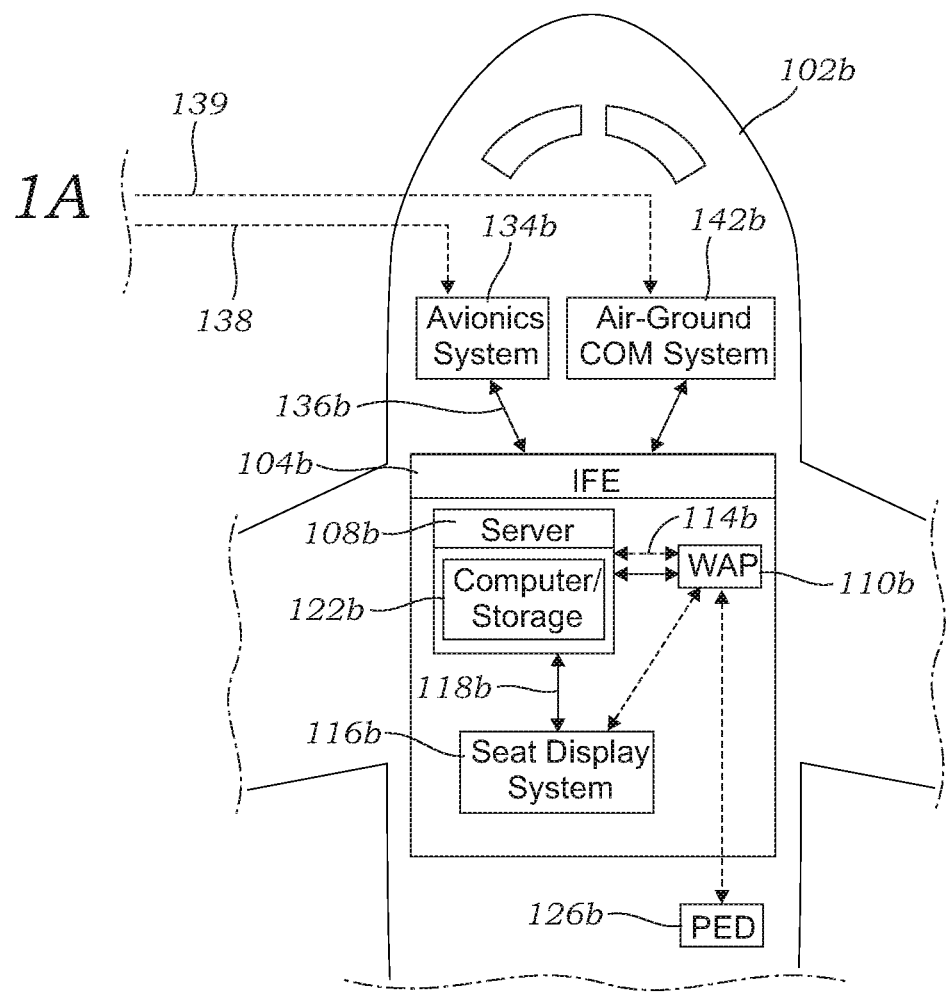

Referring to FIGS. 1A-1B, a block schematic diagram of one embodiment of a system 100 for obtaining DFS event data when installed on an airplane 102*a*, is illustrated. The system 100 includes an IFE 104*a* configured to provide in-flight entertainment, including presenting media such as movies and music on a plurality of seat display systems 106*a*. The IFE 104*a* may also provide in-flight Internet access, as described herein. The IFE 104*a* includes a server 108*a*, a WAP 110*a* in network communication with the server 108*a* via a wired network connection 112*a* and/or a WiFi wireless network connection 114*a*, and a plurality of seat display systems 116*a*. Only one seat display system 116*a* is depicted in FIGS. 1A-1B, however, the IFE 104*a* may include any suitable number of seat display systems 116*a*, such as a seat display system 116*a* installed at each seat of the airplane 102*a*. Each of the seat display systems 116*a* is in network communication with the server 108*a* via a wired network connection 118*a* and/or a wireless network connection 120*a* via the WAP 110*a*.

The server 108*a* comprises one or more computers 122*a*, and a storage device 124*a* which stores media files such as movies and music. The WAP 110*a* provides a WiFi wireless network to provide wireless network communication between the server 108*a*, WAP 110*a*, and/or seat display systems 116*a*. The WAP 110*a* may also provide wireless network communication with one or more PEDs 126*a* of passengers on the airplane. For example, the IFE 104*a* and WAP 110*a* may be configured to allow PEDs 126*a* to wirelessly connect to the WAP 110*a* and to allow the PEDs 126*a* to play media from the IFE 104*a* and/or access the Internet 128*a* via an air-to-ground communication system 130 and communication network 132 (which may include any suitable LAN, WAN, or combination thereof which is connected to the Internet 128).

The IFE 104*a* is also in communication with an avionics system 134*a* via a communication connection 136*a*, such as via an aviation standard bus or other suitable connection. The avionics system 134a determines, or obtains, airplane location data, including geographic location and altitude. The avionics system 134a may utilize a GPS module, avionics sensors, and/or remote communications with remote avionics systems (e.g., radar systems, etc.) to obtain 3-dimensional (3D) location data of the airplane, including geographical location (e.g., ground coordinates), and altitude.

The system 100 also includes an air-to-ground communication link 138 to a computerized ground system 140 to enable communication between the IFE 104 and the ground system 140. In one embodiment, the system 100 includes an air-to-ground communication system 142a to enable an air-to-ground communication link 138. Similarly, the ground system 140 includes a compatible air-to-ground communication system 144. The air-to-ground communication systems 142a, 144 may utilize a satellite communication system (e.g., the ground system may have a satellite communication module), a private cellular provider link or other suitable communication system which enables data communication between the system 100 on an airplane 102a in flight and the computerized ground system 140. Alternatively, the air-to-ground communication link between the IFE 104a and the ground system 140 may be enabled by communication between the air-to-ground communication system 142a on the airplane 102a and the air-to-ground communication system 130 external to the ground system 140, and the communication network 132 or similar communication network.

Alternatively, or in addition, to utilizing an air-to-ground communication link 138, the ground system the ground system 140 may receive the DFS event data from the airplanes via a manual offload of the DFS event data from the IFE 104a to one or more storage devices (e.g., a portable hard drive, or portable computer) and subsequent transfer of the DFS event data from the storage devices to the ground system 140.

The IFE 104a is configured through software and/or firmware to detect DFS events caused by an interfering signal, such as radar signals, within a signal range of the WAP 110a using the WAP 110a. The signal range of the WAP 110a is a space within a distance from the WAP 110a in which the WAP 110a can detect interfering signals which cause a DFS event. The IFE 104a is also configured to obtain DFS event data from the WAP 110a when the WAP 110a encounters a DFS event. When the WAP 110a detects a DFS event, the WAP 110a communicates DFS event data to the IFE 104a (e.g., to the server 108). The DFS event data includes data representing a radio channel on which interfering signal was detected, i.e., the radio channel which the WAP 110a determines must be vacated due to the DFS event caused by the interfering signal. The DFS event data may also include data representing other information regarding the DFS event, such as the time of the DFS event, etc.

The IFE 104a is also configured to obtain airplane location data from the avionics system 134a via the communication connection 136a when a DFS event occurs. In other words, a DFS event may trigger the IFE 104a to obtain airplane location data from the avionics system 134a. Alternatively, the IFE 104a may obtain airplane location data continuously from the avionics system 134a (e.g., some IFEs 104a are configured to show the current location and flight path of the airplane 102a on the seat display systems 116a). In this case, the IFE 104a simply records the airplane location data at the time of the DFS event.

The IFE 104a is also configured to associate the DFS event data with the airplane location data for the DFS event, and create a DFS event record. The IFE 104a can then transmit the DFS event record to the ground system 140 via the air-to-ground communication link, as described herein.

Figure 2:
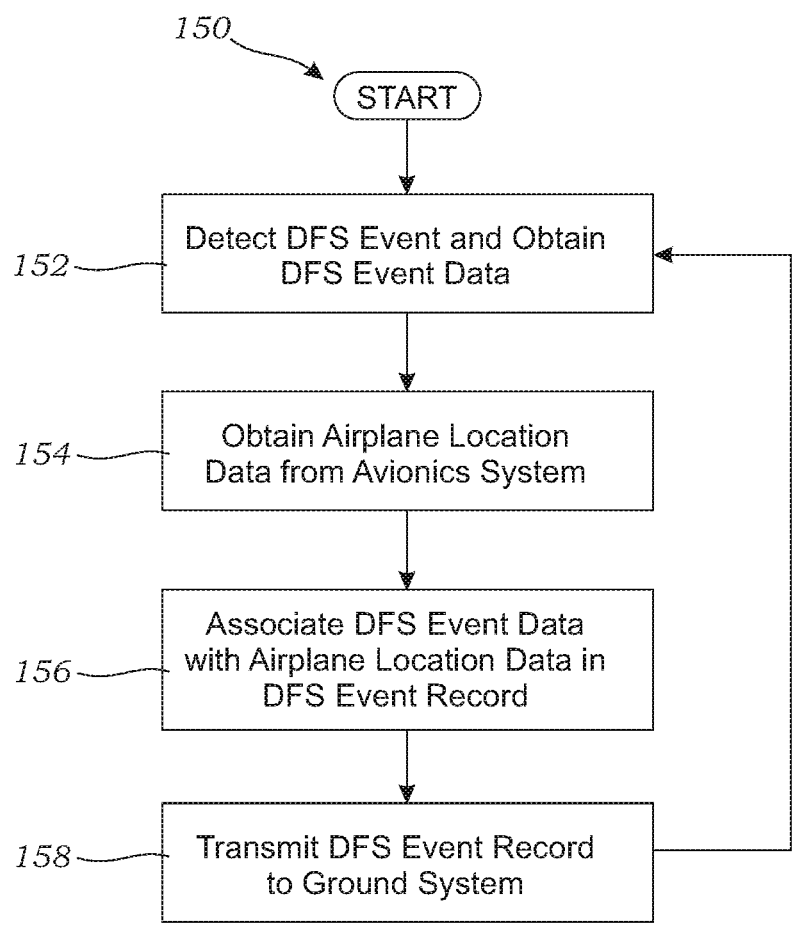
FIG. 2 illustrates a flow chart of one embodiment of a method for obtaining DFS event data when installed on an airplane using the system of FIGS. 1A-1B, according to one embodiment of the present invention.

The flow chart of FIG. 2 illustrates a method 150 by which the system 100 obtains DFS event data and provides the DFS event data to the ground system 140. At step 152, the IFE 104a uses the WAP 110a to detect a DFS event caused by an interfering signal within the signal range of the WAP 110a and receives DFS event data from the WAP 110a. At step 154, the IFE 104a obtains airplane location data at the time of the DFS event from the onboard avionics system 134a. At step 156, the IFE 104a associates the DFS event data with the airplane location data in a DFS event record. At step 158, the DFS event record is transmitted to the ground system 140 via the air-to-ground communication link 138 or 139 and 132. As shown in FIG. 2, the steps 152-158 may be repeated for a plurality of DFS events detected by the WAP 110a on the airplane 102a. Furthermore, the method 150 may be performed on a plurality of different airplanes 102b such that the ground system 140 receives one or more DFS event records for DFS events (which may be caused by different or the same interfering signal(s)) detected by respective WAPs 110b on each of the different airplanes 102b. The other airplanes 102b (only one other airplane 102b is shown in the drawings, with the understanding that there may be any suitable number of other airplanes 102b) include the same equipment as the airplane 102a.

In another embodiment of the present invention, the system 100 may also include the ground system 140, wherein the ground system 140 is configured to utilize the DFS event records to provide real-time (i.e., live) messages to other airplanes 102b to allow WAPs on the other airplanes to avoid encountering DFS events caused by the interfering signals that caused the DFS event on the airplane 102a.

Referring back to FIGS. 1A-1B, the ground system 140 includes a computer system 160. The computer system 160 may include any suitable computers, computer servers, and other computing equipment. The computer system 160 has a storage device 162 which stores a DFS database 164. The computer system 160 also has a DFS software application 166 configured to program the ground system 140 to provide the functionality as described herein. The ground system 140 is configured to execute the DFS software application 166 on the computer system 160 to perform the following functions, in real-time: (a) receive the DFS event record from the IFE 104 on the first airplane 102a; (b) analyze the DFS event record and generate a DFS message for another IFE 104b on another airplane 102b which is scheduled to travel within a predetermined vicinity of the DFS event, to allow a WAP 110b of the other IFE 104b to avoid the interfering signal which caused the DFS event; and (c) transmit the DFS message to the IFE 104b on the other airplane 102b to allow the WAP 110b of the other IFE 104b to avoid encountering a DFS event caused by the interfering signal which caused the DFS event on the first airplane 102a. The predetermined vicinity is a signal range of the WAP 110b or a typical WAP, or the signal range plus a safety margin, or other suitable 3D space at a distance which ensures that all or most WAPs on airplanes 102b traveling outside of the predetermined vicinity will not encounter a DFS event caused by the interfering signal. The DFS message includes radio channel data and DFS location data which the WAP 110b on the other airplane can utilize to avoid the interfering signal which caused the DFS event on the first airplane 102.

The radio channel data may include identification of radio channels for the other IFE to use which avoids the interfering signal when the other airplane is within the predetermined vicinity of the location of the DFS event on the first airplane 102a. In other words, the radio channel data identifies radio channels which are free of the interfering signal within the predetermined vicinity of the location of the DFS event on the first airplane 102a. In addition, or alternatively, the radio channel data may include identification of the radio channel(s) which caused the DFS event on the first airplane 102.

In one embodiment, the IFE 104b of the other airplane 102b analyzes radio channel data and DFS location data in the DFS message and determines a radio channel plan for a flight path of other airplane to avoid encountering a DFS event caused by the interfering signal. The radio channel plan defines the radio channel(s) to be used by the WAP 110b on the other airplane 102b at defined locations along the flight path of the other airplane 102b. In such case, the IFE 104b of the other airplane is configured to obtain a flight path for the other airplane 102b. The IFE 104b then analyzes the radio channel data and DFS location data in the DFS message in view of the flight path and generates a radio channel plan which sets the radio channel(s) to be used by the WAP 110b on the other airplane 102b at defined locations along the flight path of the other airplane 110b. The WAP 110b and/or IFE 104b of the other airplane 102b then uses the radio channel plan to set the radio channel of the WAP 110b based on the location of the other airplane 102b along its flight path.

In another embodiment, the DFS message may include the radio channel plan, as described above. In such case, the ground system 140 analyzes the flight path of the other airplane 102b and determines a radio channel plan for the flight path of the other airplane 102b to avoid encountering a DFS event caused by the interfering signal. In this embodiment, the ground system 140 obtains a flight plan for the other airplane 102b which includes the flight path. The ground system 140 analyzes the DFS event data and respective airplane location data for the DFS event in view of the flight path and generates a radio channel plan which sets the radio channel(s) to be used by the WAP 110b on the other airplane at defined locations along the flight path of the other airplane. The ground system 140 generates a DFS message which includes the radio channel plan and transmits the DFS message to the other airplane. Again, the WAP 110b and/or IFE 104b of the other airplane 102b then uses the radio channel plan to set the radio channel of the WAP 110b based on the location of the other airplane 102b along its flight path.

Figure 3:
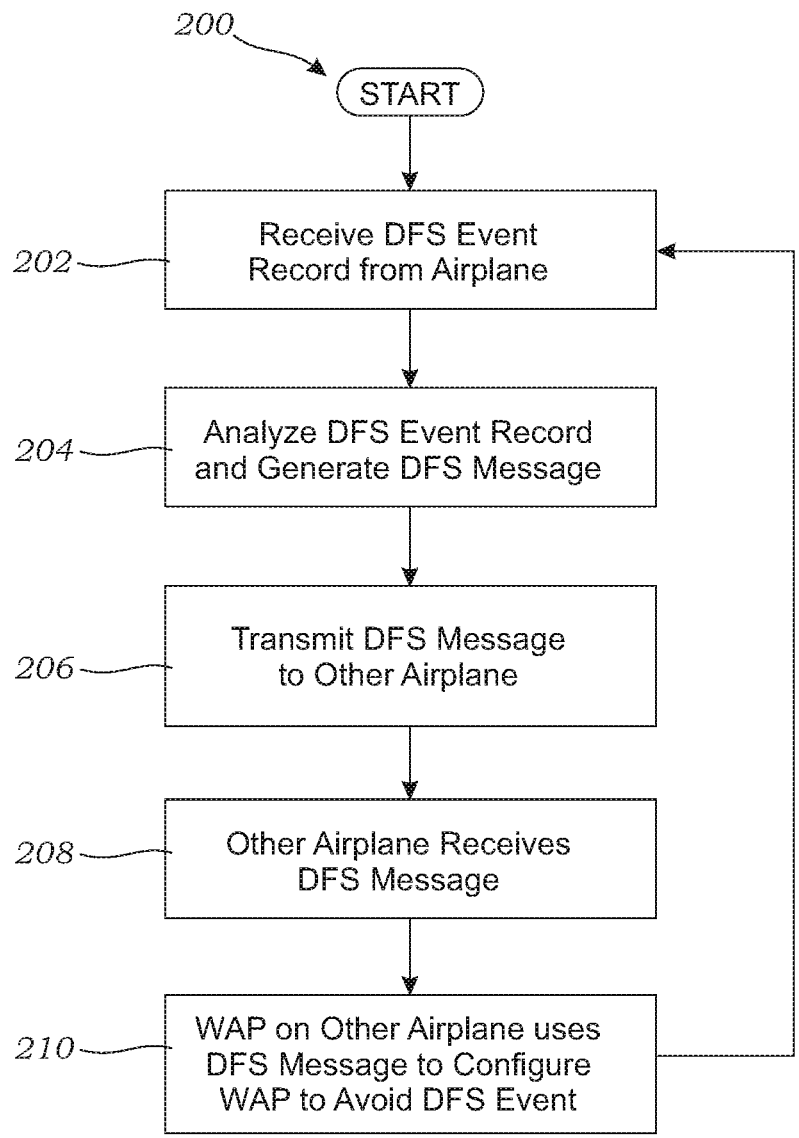
FIG. 3 illustrates a flow chart of one embodiment of a method for the ground system of the system of FIGS. 1A-1B to utilize DFS event records to provide real-time messages to other airplanes to allow WAPs on the other airplanes to avoid encountering DFS events, according to one embodiment of the present invention.

Turning to FIG. 3, a flow chart illustrates a method 200 for the ground system 140 to utilize the DFS event records to provide real-time messages to other airplanes to allow WAPs 110b on the other airplanes 102b to avoid encountering DFS events caused by the interfering signals that caused the DFS event on the airplane 102a. The method 200 includes a step 202 in which the ground system 140 receives the DFS event record from the IFE 104a (this is the receiving part of step 158 of the method 150 in which the DFS event record is transmitted from the airplane 102a to the ground system 140). At step 204, the ground system 140 analyzes the DFS event record and generates a DFS message for another IFE 104b on another airplane 102b which is scheduled to travel within a predetermined vicinity of the DFS event, to allow a WAP 110b of the other IFE 104b to avoid the interfering signal which caused the DFS event. At step 206, the ground system 140 transmits the DFS message to the IFE 104b on the other airplane 102b to allow the WAP 110b of the other IFE 104b to avoid encountering a DFS event caused by the interfering signal which caused the DFS event on the first airplane 102a. At step 208, the other airplane 102b receives the DFS message. At step 210, the WAP 110b on the other airplane utilizes the DFS message to configure the WAP 110b on the other airplane 102b to avoid a DFS event caused by the interfering signal which caused the DFS event on the first airplane 102a. The steps 202-210 are performed in real-time. Furthermore, as shown in FIG. 3, the steps 202-210 may be repeated for a plurality of DFS events detected by the WAP 110a on the airplane 102b. Furthermore, the method 200 may be performed for DFS event records received from a plurality of different airplanes 102 such that the ground system 140 receives one or more DFS event records for DFS events (which may be caused by different or the same interfering signal(s)) detected by respective WAPs 110 on each of the different airplanes 102.

Figure 4A:
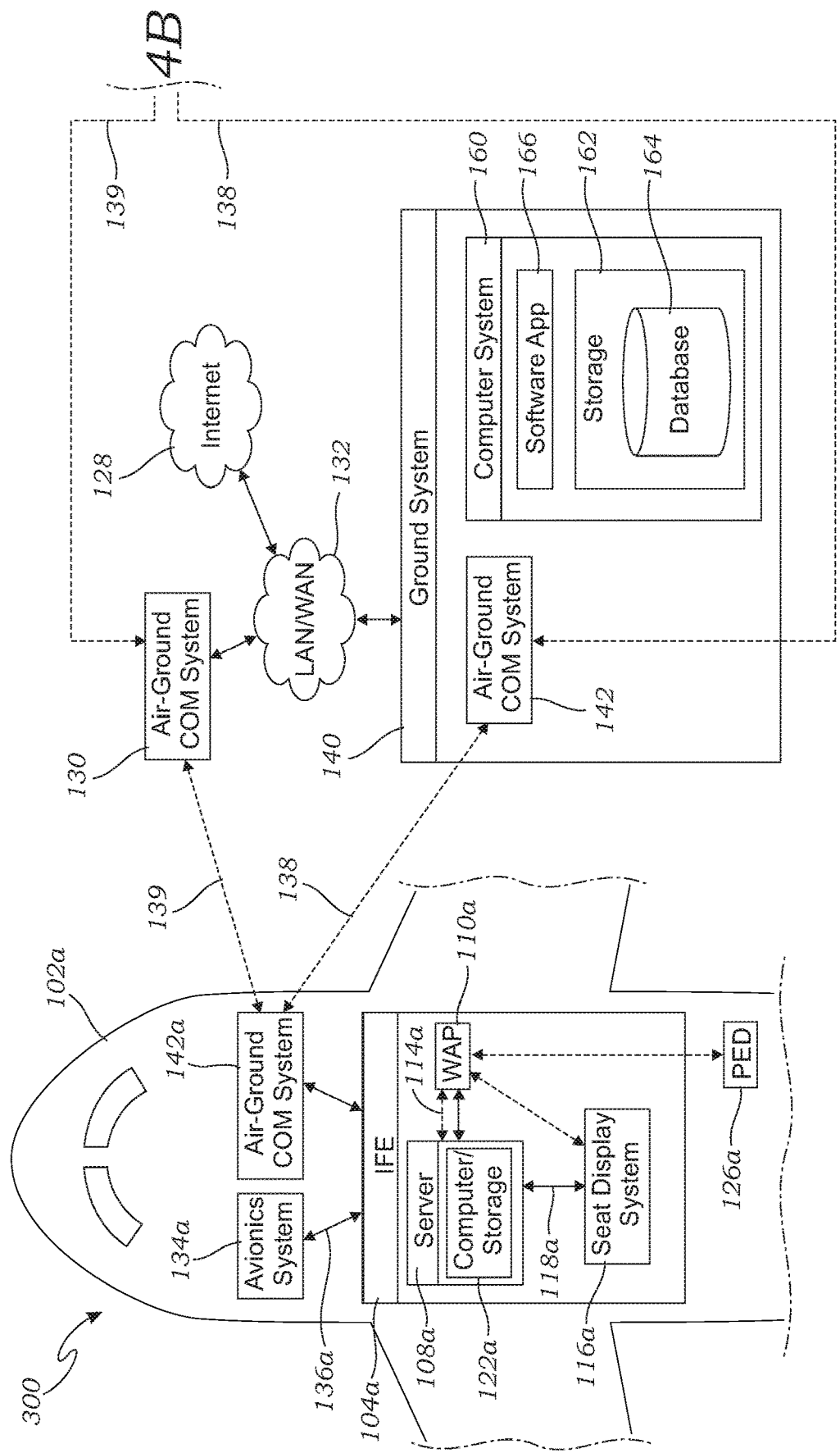
FIGS. 4A-4B illustrate a block schematic diagram of a system for analyzing and mapping DFS event data received from a plurality of different airplanes, according to one embodiment of the present invention.
Figure 4B:
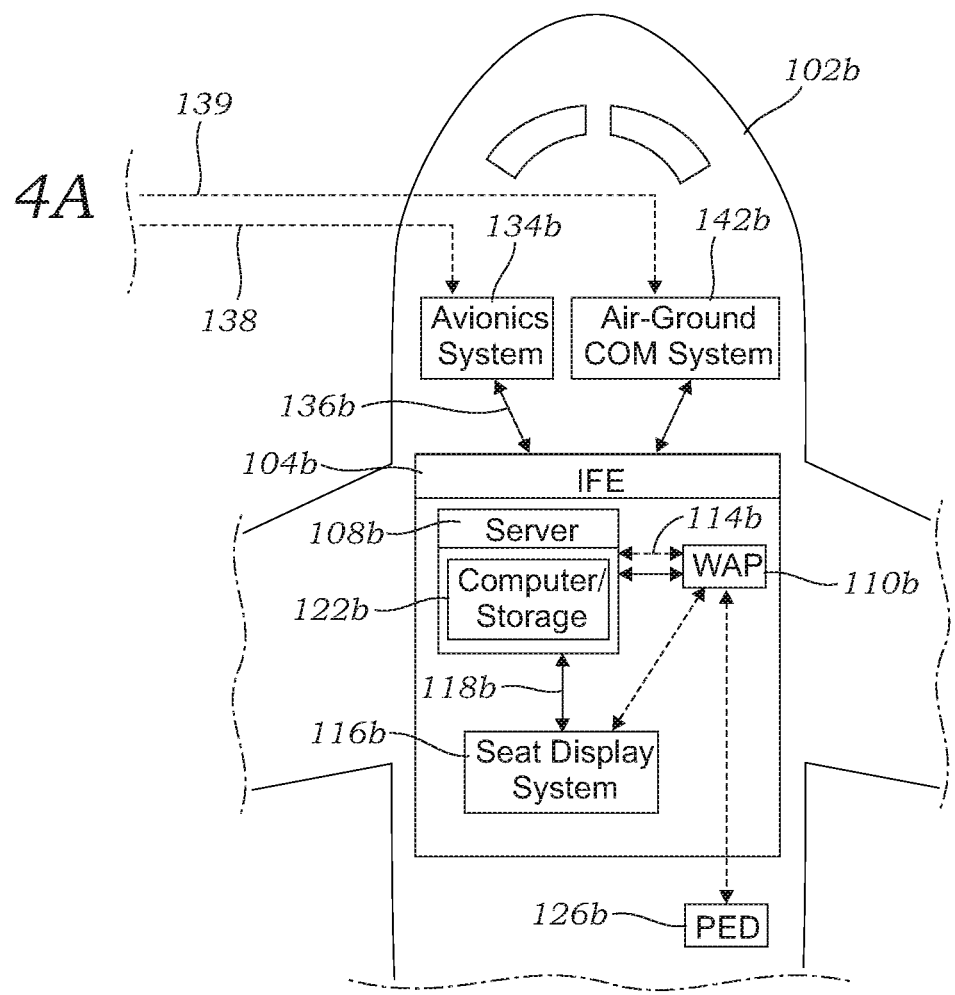
Figure 5:
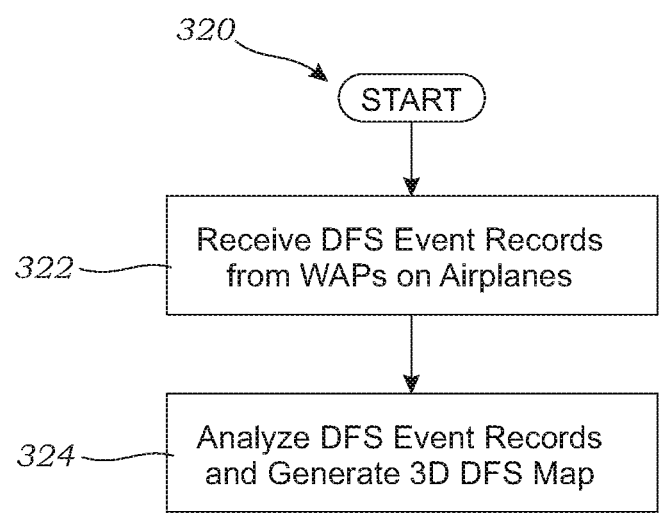
FIG. 5 illustrates a flow chart of a method for analyzing and mapping DFS event data received from a plurality of different airplanes using the system of FIGS. 4A-4B, according to one embodiment.

FIGS. 4A-4B illustrate a block schematic diagram of an embodiment of a system 300 for analyzing and mapping DFS event data received from a plurality of different airplanes 102. The system 300 may comprise a ground system 340 which is the same or similar to the ground system 140 of the system 100, described above, except that the ground system 340 is configured to analyze and map the DFS event data (which may be in the form of DFS event records, as described herein, or other suitable data). Accordingly, the DFS software application 166 is configured to program the ground system 340 to perform a method 320 as illustrated in the flow chart of FIG. 5. At step 322, the ground system 340 receives DFS event records for respective DFS events caused by respective interfering signals from a plurality of WAPs 110 on respective different airplanes 102. At step 324, the ground system 340 analyzes the DFS event records and generates a 3D DFS map of the DFS events which can be utilized to allow other airplanes 102 to avoid DFS events. For example, the 3D DFS map may represent the geographic locations and radio channel(s) of DFS events caused by interfering signals.

Figure 6:
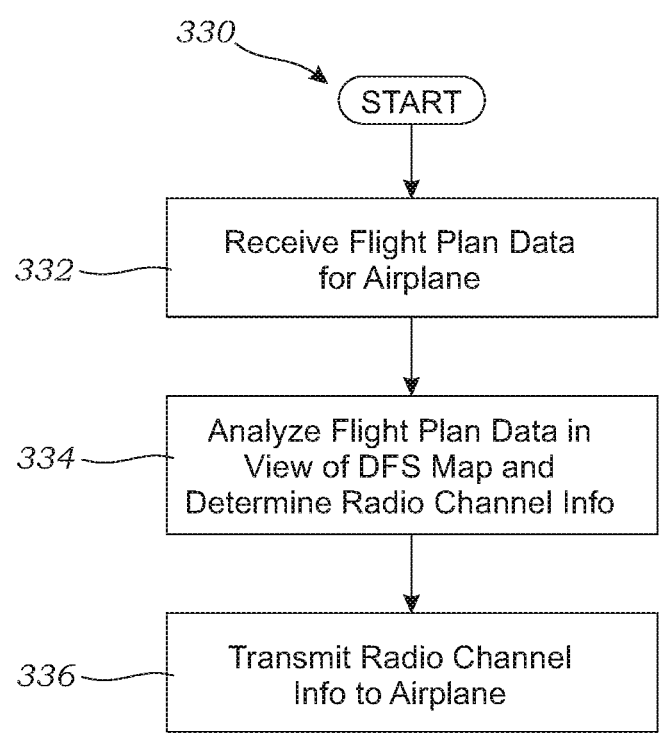
FIG. 6 illustrates a flow chart of a method for utilizing a DFS map to provide radio channel information to allow WAPs on airplanes to avoid DFS events during flights, according to one embodiment of the present invention.

The ground system 340 is further configured to utilize the DFS map to provide radio channel information (e.g., a radio channel plan, as described herein) to allow WAPs 110 on airplanes 102 to avoid DFS events during flights. In one embodiment, the DFS software application 166 is configured to program the ground system 340 to perform a method 330 as illustrated in the flow chart of FIG. 6. At step 332, the ground system receives flight plan data for a flight of an airplane. At step 334, the ground system 340 analyzes the flight plan data in view of the DFS map, and determine radio channel information for the airplane to allow a WAP 110 on the airplane 102 to avoid one or more DFS events during the flight of the airplane. At step 336, the ground system 340 transmits the radio channel information to the airplane 102, such as via the air-to-ground communication link 138. The ground system 340 may also be configured to perform the steps 332-336 all in real-time.

Figure 7:
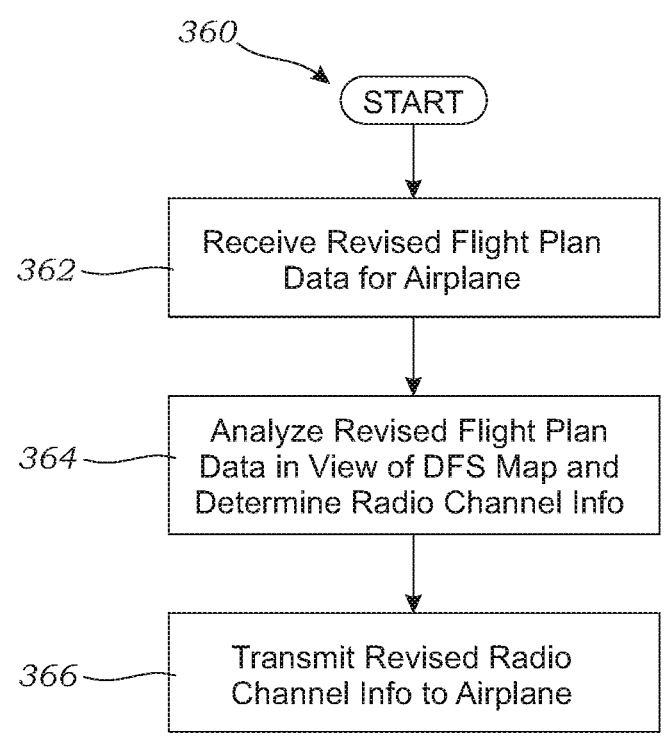
FIG. 7 illustrates a flow chart of a method for providing revised radio channel information in real-time to allow WAPs on airplanes to avoid DFS events during flights, according to one embodiment of the present invention.

Of course, the ground system 140 may utilize features and methods described herein to use the DFS map to provide WAP radio channel information to a fleet of airplanes 102 to allow WAPs 110 on the fleet of airplanes 102 to avoid DFS events during the flights of the fleet of airplanes 102. The ground system 140 is configured to receive flight plan data for a fleet of planned airplane routes. The ground system 140 analyzes the flight plan data for each airplane route in view of the DFS map and determines radio channel information for each airplane route to allow a WAP 110 on an airplane 102 on that airplane route to avoid one or more DFS events during a flight using that route. The ground system 140 then transfers the radio channel information for each airplane route to the airplane fleet. The ground system 140 may transfer the radio channel information via the air-to-ground communication link 138, or via manual data loading of the radio channel information from a storage device (e.g., a portable hard drive or portable computer) to a respective IFE on each airplane 102. The ground system 340 may also be configured to provide revised radio channel information in real-time when the flight plan for the airplane 102 is changed. A change in a flight plan may occur before or during a flight, due to weather, other air traffic, or other conditions. In one embodiment, the DFS software application 166 is configured to program the ground system 340 to perform a method 360 as illustrated in the flow chart of FIG. 7. At step 362, the ground system 340 receives revised flight plan data for the flight of the airplane 102. At step 364, the ground system 340 analyzes the revised flight plan data in view of the DFS map and determines revised radio channel information for the airplane 102 to allow the WAP 110 on the airplane 102 to avoid one or more DFS events during the flight of the airplane 102. At step 366, the ground system 340 transmit the revised radio channel information to the airplane 102, such as via the air-to-ground communication link 138. The ground system 340 may also be configured to perform the steps 362-366 all in real-time.

As depicted in FIGS. 4A-4B, the system 300 for analyzing and mapping DFS event data for DFS event data received from a plurality of different airplanes 102 may also include any one or more of the other parts of the system, including the IFE 104, avionics system 134, air-to-ground communication system 142, air-to-ground communication system 130, communication network 132, internet 128, etc. Furthermore, the system 300 may be configured to also have all of the functionality as described herein for the system 100, and the methods of using the system 300 may include any combination or sub-combination of the methods for using the system 100 and the methods for using the system 300.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A system for obtaining Dynamic Frequency Selection ("DFS") data when installed on a first airplane, the system comprising:
   an in-flight entertainment system ("IFE") including a wireless access point configured to wirelessly communicate with one or more wireless electronic devices, the wireless access point configured to detect DFS events, the IFE in communication with an onboard avionics system configured to obtain airplane location data and provide the airplane location data to the IFE;
   wherein the IFE is configured to use the wireless access point to detect a DFS event caused by an interfering signal within a signal range of the wireless access point and obtain DFS event data for the DFS event, obtain airplane location data at the time of the DFS event from the onboard avionics system, associate the DFS event data with the airplane location data in a DFS event record,
   wherein the IFE is further configured to transmit the DFS event record to a ground system via one of: (a) an air-to-ground communication link or (b) a manual offload of the DFS event data from the IFE on each airplane to one or more storage devices and transfer of the DFS event data from the one or more storage devices to the ground system, and
   wherein the ground system is configured to, in real-time: (a) receive the DFS event record; (b) analyze the DFS event record; and (c) transmit a DFS message to a second IFE on a second airplane which is scheduled to travel within a predetermined vicinity of the DFS event, to allow a wireless access point of the second IFE to avoid the interfering signal which caused the DFS event.

2. The system of claim 1, wherein the DFS message includes radio channel data which the wireless access point of the second IFE is configured to utilize to avoid the interfering signal which caused the DFS event.

3. The system of claim 2, wherein the radio channel data includes at least one of: (a) identification of one or more radio channels which avoid the interfering signal which caused the DFS event; and (b) identification of one or more radio channels which caused the DFS event.

4. The system of claim 1, wherein the DFS message includes radio channel data and DFS location data for the DFS event which the wireless access point of the second IFE is configured to utilize to avoid the interfering signal which caused the DFS event.

5. The system of claim 4, wherein:
   the radio channel data includes at least one of: (a) identification of one or more radio channels which avoid the interfering signal which caused the DFS event; and (b) identification of one or more radio channels which caused the DFS event; and
   the DFS location data includes a delineation of at least a portion of a flight path of the different airplane in which to avoid the interfering signal.

6. A system for analyzing and mapping Dynamic Frequency Selection ("DFS") data obtained from a plurality of airplanes, comprising:
   a computerized ground system comprising a computer, the ground system configured to receive DFS event data from a plurality of wireless access points on respective different airplanes, the wireless access points being components of an in-flight entertainment system ("IFE") on each airplane, the DFS event data for DFS events caused by respective interfering signals within a respective signal range of the respective wireless access point, the DFS event data including associated location data at the respective time of the respective DFS event from a respective onboard avionics system on each airplane; and
   the computerized ground system configured to analyze the DFS event data and generate a DFS map of the DFS event data to select radio channels for a wireless access point on an airplane to avoid DFS events.

7. The system of claim 6, wherein the computerized ground system is configured to receive the DFS event data from the airplanes via one of: (a) an air-to-ground communication link or (b) a manual offload of the DFS event data from the IFE on each airplane to one or more storage devices and transfer of the DFS event data from the one or more storage devices to the computerized ground system.

8. The system of claim 7, wherein the computerized ground system comprises either a satellite communication module or a private cellular provider link for receiving the DFS event data via the air-to-ground communication link.

9. The system of claim 6, wherein the ground system is further configured to:
    receive flight plan data for a flight of a first airplane;
    analyze the flight plan data in view of the DFS map and determine radio channel information for the first airplane to allow a wireless access point on the first airplane to avoid one or more DFS events during the flight of the first airplane; and
    transmit the radio channel information to the first airplane via an air-to-ground communication link.

10. The system of claim 9, wherein the ground system is further configured to, in real-time:
    (a) receive revised flight plan data for the flight of the first airplane; (b) analyze the revised flight plan data in view of the DFS map and determine revised radio channel information for the first airplane to allow the wireless access point on the first airplane to avoid one or more DFS events during the flight of the first airplane; and (c) transmit the revised radio channel information to the first airplane.

11. The system of claim 6, wherein the ground system is further configured to:
    receive flight plan data for a fleet of planned airplane routes;
    analyze the flight plan data for each airplane route in view of the DFS map and determine radio channel information for each airplane route to allow a wireless access point on an airplane on that airplane route to avoid one or more DFS events during a flight using that route; and
    transfer the radio channel information for each airplane route to the airplane fleet via manual data loading of the radio channel information from a storage device to a respective IFE on each airplane.

12. A method for obtaining Dynamic Frequency Selection ("DFS") data, the method comprising:
    detecting a DFS event using a wireless access point in an airplane, the DFS event caused by an interfering signal within a signal range of the wireless access point, and obtaining DFS event data for the DFS event from the wireless access point;
    obtaining location data at the time of the DFS event from an onboard avionics system on the airplane;
    associating the DFS event data with the airplane location data in a DFS event record;
    transmitting the DFS event record to a ground system; and
    performing, in real-time, by the ground system (a) receiving the DFS event record; (b) analyzing the DFS event record; and (c) transmitting a DFS message to a second airplane which is scheduled to travel within a predetermined vicinity of the DFS event to allow a wireless access point of the second airplane to avoid the interfering signal which caused the DFS event.

13. The method of claim 12, wherein the DFS message includes radio channel data which the wireless access point of the second airplane is configured to utilize to avoid the interfering signal which caused the DFS event.

14. The method of claim 12, wherein the DFS message includes radio channel data and DFS location data for the DFS event which the wireless access point of the second airplane is configured to utilize to avoid the interfering signal which caused the DFS event.

15. A method for analyzing and mapping Dynamic Frequency Selection ("DFS") data from a plurality of airplanes, comprising:
    receiving DFS event data from a plurality of wireless access points on respective different airplanes, the DFS event data caused by respective interfering signals within a respective signal range of the respective wireless access point, the DFS event data including associated location data at the respective time of the respective DFS event from a respective onboard avionics system on each airplane; and
    analyzing the DFS event data and generating a DFS map of the DFS event data to select radio channels on an airplane to avoid DFS events.

16. The method of claim 15, further comprising, performing the following in real-time:
    receiving flight plan data for a flight of a first airplane;
    analyzing the flight plan data in view of the DFS map and determining radio channel information for the first airplane to allow a wireless access point on the first airplane to avoid one or more DFS events during the flight of the first airplane; and
    transmitting the radio channel information to the first airplane.

17. The method of claim 16, further comprising, performing the following, in real-time:
    receiving revised flight plan data for the flight of the first airplane;
    analyzing the revised flight plan data in view of the DFS map and determining revised radio channel information for the first airplane to allow the wireless access point on the first airplane to avoid one or more DFS events during the flight of the first airplane; and
    transmitting the revised radio channel information to the first airplane.

* * * * *